United States Patent

[11] 3,622,511

[72] Inventors James J. Pizzo;
Malcolm F. McNeil, both of San Jose, Calif.
[21] Appl. No. 71,710
[22] Filed Sept. 14, 1970
[45] Patented Nov. 23, 1971
[73] Assignee FMC Corporation
San Jose, Calif.

[54] SEWAGE TREATMENT SYSTEM
8 Claims, 3 Drawing Figs.
[52] U.S. Cl............................................. 210/62,
110/8, 126/360, 159/16 A, 203/100, 203/DIG. 5,
210/67, 210/152
[51] Int. Cl............................................. C02c 1/00
[50] Field of Search.......................................... 210/62, 67,
152; 203/100, DIG. 5; 159/16 A; 126/360; 110/8

[56] References Cited
UNITED STATES PATENTS

| | | | |
|---|---|---|---|
| Re. 26,352 | 2/1968 | Greenfield.................. | 210/152 X |
| 2,064,953 | 12/1936 | Serpas....................... | 159/16 A X |
| 2,538,412 | 1/1951 | Cecil et al................... | 159/16 A X |
| 2,764,234 | 9/1956 | Rauh......................... | 159/16 A |
| 3,480,513 | 11/1969 | Martin....................... | 159/16 A X |
| 3,541,594 | 11/1970 | Wallace...................... | 210/152 X |

Primary Examiner—Michael Rogers
Attorneys—F. W. Anderson and C. E. Tripp

ABSTRACT: A compact mechanical system for treating sewage in which the raw sewage is macerated and supplied to an evaporator that employs a submersible burner wherein some of the sewage is burned and the solids concentration is increased. Steam is driven off and recovered as water for reuse while the concentrated sludge is incinerated.

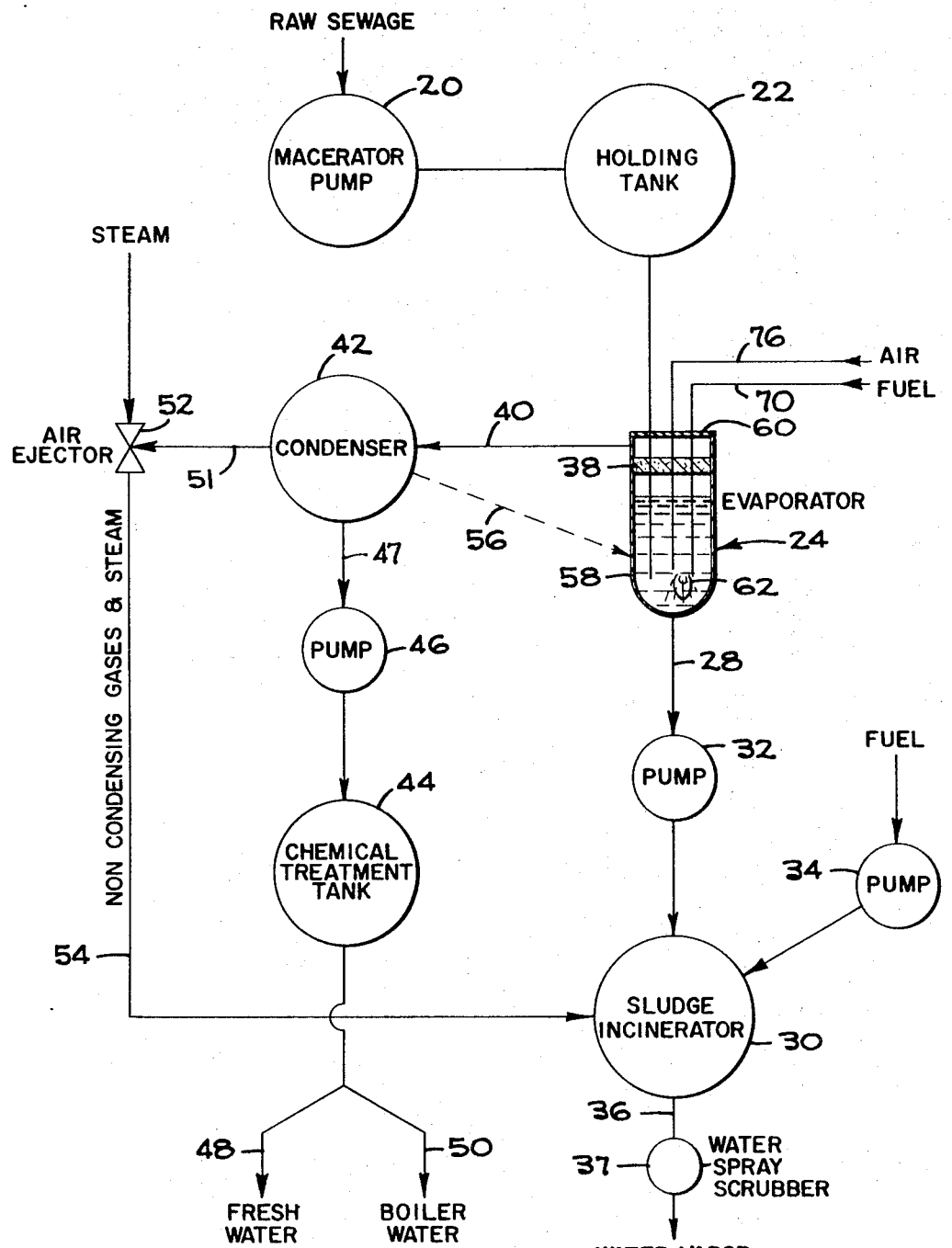
FIG_1

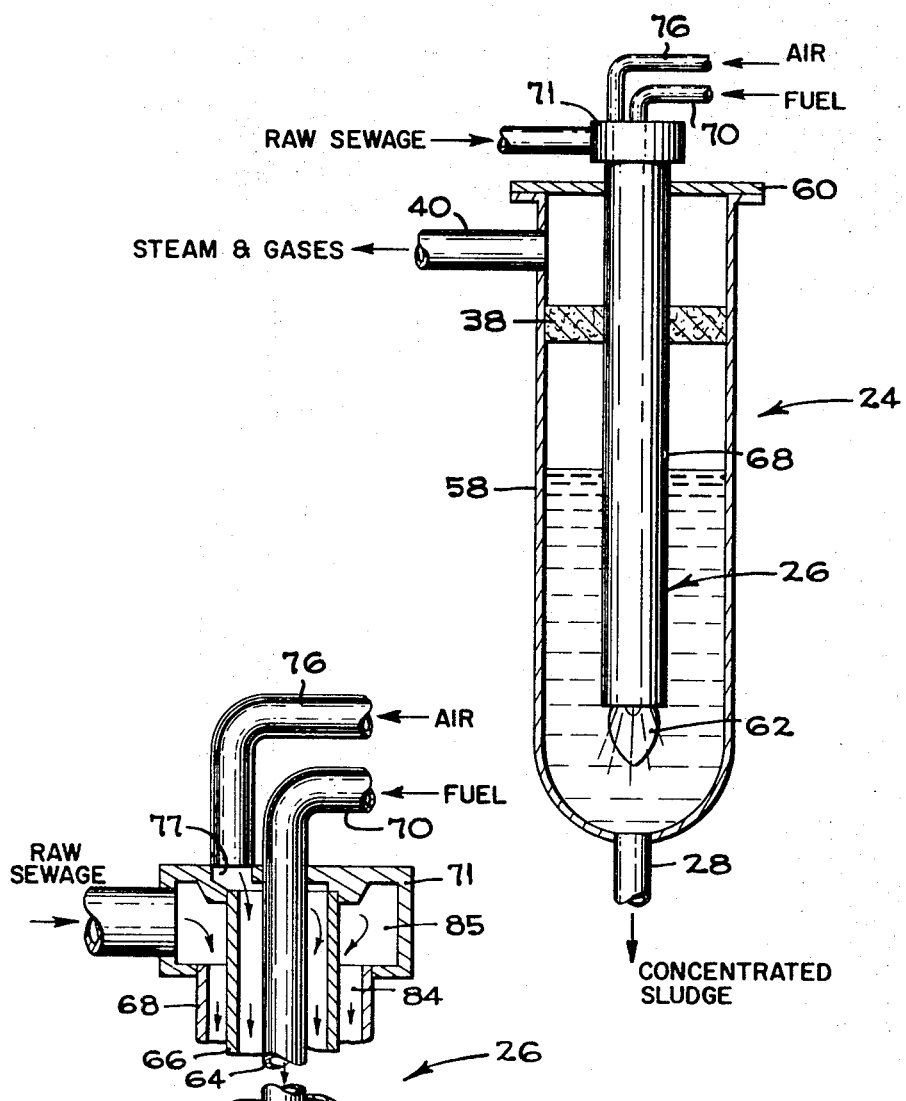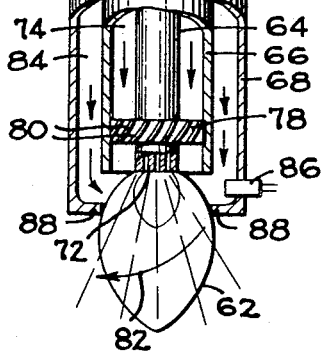

SEWAGE TREATMENT SYSTEM

BACKGROUND OF THE INVENTION

1. Field of the Invention

The present invention concerns sewage treatment systems of the mechanical type and more particularly systems of a compact nature which are applicable for shipboard use.

2. Description of the Prior Art

Greenfield, U.S. Pat. No. Re. 26,352 describes a mechanical sewage treatment system in which the sewage is concentrated in evaporators of the type having heat transfer elements exposed to the sewage. The sewage is then subjected to centrifuges and a press to extract the oils from the sewage for later use in the boiler furnace.

SUMMARY OF THE INVENTION

The purpose of the present invention is to provide a simple and compact mechanical sewage treatment system for use in small ships while in harbors and inland waters to prevent pollution. One of the features of the invention is to completely treat the sewage so that the end products are inactive and nonpolluting. This is achieved by concentrating the sewage in an evaporator to drive off water in the form of steam from which substantially pure water is recovered and can be reused in the sewage and boiler systems found on ships.

A further feature is the employment of a submersed burner in the evaporator. By the use of such a burner the easily combustible products in the sewage such as oils and paper are consumed. An additional advantage resides in the use of the submersed burner, in that no byproducts of incomplete combustion are released to the atmosphere.

A current problem in evaporators currently available is the buildup of scale and deposits on the internal evaporator components such that cleaning and/or removal is periodically necessary. In the present device this problem is eliminated since there are no coils or heat transfer elements in the evaporator to trap the sludge and the burner flame is surrounded by the liquid sewage.

The submersed burner incorporates a sewage supply channel that directs incoming sewage to the evaporator through the combustion bubble of the burner insuring consumption of readily combustible material.

A further advantage of the evaporator of the present invention is that it may be employed with salt water as well as fresh water. Presently known evaporators employing steam require heat transfer units. When operating at temperatures approaching 350° F. serious scaling problems arise after relatively short operating periods requiring mechanical or thermal descaling techniques such as cold shocking. These evaporators also develop organic deposits or glazes on the heat transfer elements that contact the sewage seriously reducing the heat exchange efficiency.

Another advantage of the system is greater simplicity than the prior art devices such as Greenfield. The centrifuges, press, and tank are eliminated but the heating value of the sewage is still used for combustion in the incinerator.

DESCRIPTION OF THE DRAWINGS

FIG. 1 is a schematic flow diagram of the sewage treatment system.

FIG. 2 is an enlarged view of the evaporator, having portions broken away.

FIG. 3 is an enlarged view of submersed burner nozzle.

TREATMENTS SYSTEM

In the sewage treatment of the present invention as shown in FIG. 1, raw sewage coming from sanitary facilities, kitchen refuse, bilge water and other waste sources upon a ship are fed to a macerator pump 20 which reduces the size of the incoming refuse to a maximum of 5 millimeters. The sewage is then fed into a holding tank 22 which is provided to accommodate surges of raw sewage greater than the constant operating capacity of the system. From the holding tank 22 the raw sewage is fed into an evaporator 24. This evaporator includes a submersible burner 26 that is supplied externally by air at approximately 200 p.s.i. and by fuel such as diesel oil. The submersed burner 26 is effective to burn all combustibles in the raw sewage while raising the internal temperature in the evaporator to approximately 400° F. at 15 p.s.i.g. The evaporator is effective to concentrate the raw sewage such that the sludge reaches the level of 5 percent solids while water in the form of steam and other gases are driven off, as will be explained presently. The concentrated sludge leaves the evaporator 24 through line 28 and is supplied to a sludge incinerator 30 by means of a pump 32. The incinerator may be of any well-known type and is supplied by fuel such as diesel oil by a pump 34. This burner develops a temperature in the order of 1,600° F. at 0 p.s.i.g. and reduces the concentrated sludge to water vapor, carbon dioxide and a small amount of ash which exits the burner.

A water spray scrubber 37 is installed in line 36 to remove ash particles prior to discharging the incinerator exhaust from an exhaust stack or funnel via line 36.

The gases and water vapor driven off by the submersed burning in the evaporator passes through a demister 38 which causes some recondensation of the steam and prevents passage of solids. This demister may be made of such material as stainless steelwool or the like. The gases then pass out of the evaporator via line 40 into a condenser 42. Here the steam and gases are condensed and if desired supplied to a chemical treatment tank 44 via a line 47 by means of a pump 46. The employment of such chemical treatment tank in which the recovered gases now in the form of water may be treated with chlorine is optional and the condensed water may be directly reused as fresh water 48 or boiler water 50 in either the sanitary system or the steam generating boilers normally found on board ships. Noncondensing gases are withdrawn from the condenser 42 through line 51 by means of an air ejector 52. The air ejector may be driven by a 150 to 200 p.s.i.g. source of steam. From the air ejector 52 the noncondensing gases are routed to the sludge incinerator via line 54 where they are consumed in conjunction with the concentrated sludge. Some of these gases such as methane also assist in the burning of the sludge.

In order to improve the operating efficiency of the system and reduce heat loss, heat recovered from the gases in the condenser 42 is returned to the evaporator 24, by any well-known means such as indicated by line 56. It is important, however, that such heat transfer means does not directly contact the raw sewages in the evaporator in order to prevent the buildup of organic deposits or scale which could eventually plug up the evaporator or seriously reduce its operating efficiency.

The sewage treatment system may also be used with salt water instead of fresh. The efficiency is reduced somewhat because the salt is also removed with the sewage.

Evaporator and Submersible Burner

The evaporator 24 best seen in FIG. 2 comprises a sealed tank 58 having a smooth interior to prevent the buildup of scale or sludge. Near the upper end of the tank 58, the steam and gasses released are removed through line 40 while the concentrated sludge exits at the bottom via line 28. A removable cover plate 60 at the top of the tank permits installation and removal of the submersible burner assembly 26 and the demister 38.

As can be seen in FIG. 2, the submersible burner assembly 26 extends beneath the surface of the liquid sewage in the tank 58 and the combustion bubble 62 produced at its lower end transmits heat directly to the liquid sewage.

The construction of the submersible burner assembly 26 is best shown in FIG. 3. Here it can be seen that the burner is comprised of three concentric tubes 64, 66 and 68. The innermost tube 64 serves to conduct fuel from an external supply line 70 through a cap 71 to the lower portion of the burner. At the bottom end of the tube 64, a nozzle 72 serves to spray and distribute the fuel.

Tube 66 is mounted in the cap 71 concentrically with the inner fuel supply tube 64 forming an air passage 74 which communicates with an external air supply line 76 through a chamber 77. A vortex generator 78 is positioned in the air passage 74 between tubes 64 and 66 near their lower ends and includes multiple inclined vanes 80. This vortex generator 78 causes the combustion air to swirl as indicated by arrow 82; thereby improving the mixing of fuel and air and improving the efficiency of combustion.

The outer tube 68 is supported in the cap 71 concentrically with tube 66 forming a sewage supply passage 84. A second annular chamber 85 in the cap 71 formed between the cap and tube 66 connects the raw sewage line and the sewage supply passage 84. An ignitor 86, positioned in the lower portion of the outer tube 68, is employed to ignite the air and fuel mixture.

Formed at the end of the outer tube 68, is a circumferential lip 88. This lip insures that the raw sewage passing through passage 84 is positively directed through the combustion bubble 62 to insure consumption of all readily combustible matter (such as oil, paper and the like).

Although the best mode contemplated for carrying out the present invention has been herein shown and described, it will be apparent that modification and variation may be made without departing from what is regarded to be the subject matter of the invention.

What we claim is:

1. A method of treating sewage comprising the steps of macerating the incoming sewage, supplying the sewage to an evaporator, adding the heat of evaporation and concentrating the sewage in the evaporator by driving off steam and gases, supplying the concentrated sewage to an incinerator which reduces the sewage to ash, condensing the steam and gases driven off from said evaporator, reclaiming the water from said steam for reuse, and supplying noncondensing gases from the condenser to the incinerator, the improvement wherein the heat of evaporation is added in the evaporator by submersibly burning the readily combustible portion of the sewage.

2. The method of claim 1 wherein said reclaiming step includes chemically treating the water with chlorine or the like.

3. The method of claim 1 wherein said incinerator operates at a temperature in the order of 1,600° F.

4. The method of claim 1 wherein the sewage is macerated to a size of approximately 5 millimeters.

5. The method of claim 1 wherein the sewage is concentrated to 5 percent solids.

6. An apparatus for mechanically treating sewage comprising the combination of means for macerating the sewage, an evaporator for concentrating the sewage, said evaporator including a submersible burner, means for condensing steam driven off by said evaporator, means for incinerating said concentrated sewage, means for extracting noncondensing gases from said condensing means, and means supplying noncondensing gases to the incinerating means for combustion.

7. The apparatus of claim 6 wherein said submersible burner comprises multiple separate passages for fuel air and incoming sewage, said sewage passage being so cooperatively positioned with respect to the combustion bubble formed by the burner that all incoming sewage is directed to said combustion bubble.

8. The burner of claim 7 wherein a vortex generator is positioned in the air passage to swirl the air to improve the efficiency of combustion.

* * * * *